United States Patent
Huber et al.

(10) Patent No.: US 8,078,094 B1
(45) Date of Patent: Dec. 13, 2011

(54) UNIVERSAL MULTI-PURPOSE RF SIGNAL DISTRIBUTION SYSTEM

(75) Inventors: Kurt Huber, Kennesaw, GA (US); Dan Edwards, Duluth, GA (US); Sheldon Meredith, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1224 days.

(21) Appl. No.: 11/758,734

(22) Filed: Jun. 6, 2007

Related U.S. Application Data

(60) Provisional application No. 60/896,147, filed on Mar. 21, 2007.

(51) Int. Cl.
- H04B 7/216 (2006.01)
- H04B 7/185 (2006.01)
- H04B 7/00 (2006.01)
- H04B 1/38 (2006.01)
- H04B 1/00 (2006.01)
- G08C 17/00 (2006.01)
- H04H 20/71 (2008.01)
- H04L 27/06 (2006.01)

(52) U.S. Cl. ......... 455/3.01; 455/69; 455/522; 455/571; 370/310; 370/311; 370/318; 370/342; 375/341

(58) Field of Classification Search .................. 375/341; 370/342, 318, 310, 311; 455/571, 522, 69, 455/3.01

See application file for complete search history.

(56) References Cited

U.S. PATENT DOCUMENTS

| | | | |
|---|---|---|---|
| 4,276,514 A * | 6/1981 | Huang | 330/149 |
| 6,052,033 A * | 4/2000 | Schneider | 330/302 |
| 7,215,972 B2 * | 5/2007 | Premakanthan et al. | 455/522 |
| 7,609,781 B2 * | 10/2009 | Kerth et al. | 375/297 |
| 2005/0143024 A1 * | 6/2005 | Sung et al. | 455/101 |
| 2005/0286658 A1 * | 12/2005 | Hasebe et al. | 375/341 |
| 2006/0172781 A1 * | 8/2006 | Mohebbi | 455/571 |
| 2008/0259893 A1 * | 10/2008 | Murata et al. | 370/342 |
| 2009/0088098 A1 * | 4/2009 | Xu et al. | 455/127.2 |
| 2009/0285330 A1 * | 11/2009 | Premakanthan et al. | 375/297 |
| 2010/0022215 A1 * | 1/2010 | Ganger et al. | 455/339 |
| 2010/0062815 A1 * | 3/2010 | Kim et al. | 455/575.7 |

\* cited by examiner

*Primary Examiner* — Temesgh Ghebretinsae
*Assistant Examiner* — Bobbak Safaipour
(74) *Attorney, Agent, or Firm* — Parks IP Law LLC; Li K. Wang, Esq.

(57) ABSTRACT

The disclosed architecture provides a co-siting solution to the many different proprietary systems that are being sold today for cellular communications. The architecture is a universal multi-purpose signal distribution chassis for conditioning and distributing cellular communications signals by providing the interface to a wide variety of cellular communications equipment on the market. A receive interface receives signals, amplifies the signals, and splits (or distributes) the signals for communications to various pieces of equipment and technologies that can be employed in a base station tower system, for example. This is particularly useful in co-siting situations where many different types of technologies and equipment are hosted by one set of antennas.

21 Claims, 9 Drawing Sheets

UNIVERSAL MULTI-PURPOSE RF SIGNAL DISTRIBUTION SYSTEM

CROSS-REFERENCE TO RELATED APPLICATIONS

This application claims the benefit of U.S. Provisional Application Ser. No. 60/896,147, filed Mar. 21, 2007, the entirety of which is hereby incorporated by reference.

TECHNICAL FIELD

This invention relates to signal routing systems, and more specifically, to signal distribution in cellular systems.

BACKGROUND

Cellular carriers expend significant resources in terms of equipment and technical personnel to continue to meet the needs for high reliability and failover mechanisms in order to maintain signals for calls and associated services to subscribers. The rapidly changing cellular technology places demands on the carriers to not only maintain existing systems but to incorporate new or updated equipment in the field and other locations. Such changes can introduce equipment incompatibilities that can require reconfiguration of physical systems in terms of rack space as well as electrical incompatibilities that further require signal conditioning to meet existing interfaces.

Moreover, with the mix of cellular bands and technologies required in many locations to support coverage for sectors and cells, for example, tower stations now become a blend of equipment ranging from legacy hardware to updated hardware to proprietary systems in support of other services, and so on. In other words, co-siting further complicates systems and support of those systems by the difference in interconnections, signals levels, equipment form factors, etc. The expense involved with outright replacing old equipment with new equipment and the personnel training can be enormous.

SUMMARY

The following presents a simplified summary in order to provide a basic understanding of some aspects of the disclosed architecture. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a solution to the many different proprietary systems that are being offered and/or utilized today in carrier-based cellular communications systems. The architecture fixes the co-siting problem where multiple technologies are applied in the field to a single set of frequencies.

A universal multi-purpose signal distribution system is provided for receiving, conditioning, and distributing cellular communications signals when using a wide variety of industrial cellular communications equipment. A receive interface receives signals, amplifies the signals, and splits (or distributes) the signals for communications to various pieces of equipment and technologies that can be employed in a base station tower system, for example. This is particularly useful in co-siting situations where many different types of technologies and equipment are hosted by one set of antennas.

More specifically, the architecture includes a receive active interface employed for a cellular-band receive multi-coupler for two diverse receive paths, each path comprising a low noise amplifier (LNA) followed by an 8-way splitter in a standard rack-mount chassis. Each LNA of the interface can be alarmed and driven by an independent power supply that is fed directly from a base site DC power source. The operational frequency band includes, in one implementation, the complete receive cellular A and B bands from A through B, including all extended spectrum for each band.

A more expansive application includes a filtering system in combination with the active interface for receiving and distributing diversity signals to the base station equipment and antennas systems.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
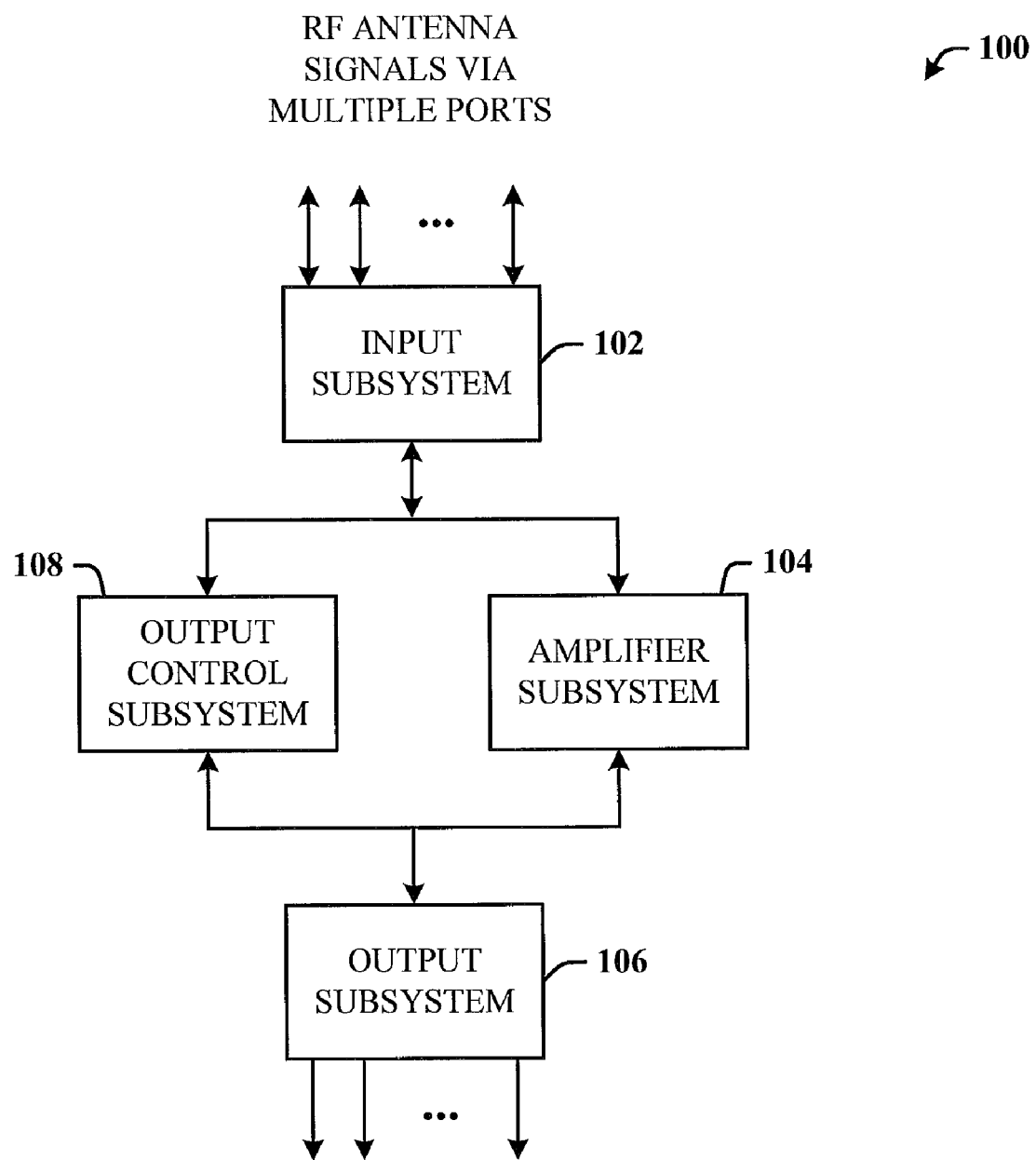
FIG. 1 illustrates a receive signal distribution system in accordance with an aspect.

The disclosed system includes a universal multi-purpose signal distribution chassis for conditioning and distributing cellular communications signals by providing an active interface to a variety of cellular communications equipment that could be installed and used at a base station, for example. An active receive interface receives signals, amplifies the signals, and splits (or distributes) the signals for communications to various pieces of equipment and technologies that can be employed in a base station tower system, for example.

As required, detailed novel embodiments are disclosed herein. It must be understood that the disclosed embodiments are merely exemplary examples and may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, wellknown components, systems, materials or methods have not been described in detail in order to avoid obscuring the invention. Therefore, specific structural and functional details disclosed herein are not to be interpreted as limiting, but merely as a basis for the claims and as a representative basis for teaching one skilled in the art to variously employ the invention.

Reference is now made to the drawings, wherein like reference numerals are used to refer to like elements throughout.

FIG. 1 illustrates a receive signal distribution system 100 in accordance with an aspect of the present invention. The system 100 includes an input subsystem 102 for receiving one or more RF antenna signals (e.g., cellular-band diversity signals) via corresponding receive paths. An amplifier subsystem 104 provides signal amplification for driving multiple outputs for signal distribution via an output subsystem 106. The system 100 can also include an output control subsystem 108 for controlling signal levels at one or more outputs of the output subsystem.

The input subsystem 102, amplifier subsystem 104, the output subsystem 106, and output control subsystem 108 all can be designed into a single unit. Other aspects of the system 100 include the implementation of one or more outputs that are electrically isolated, redundant power supplies for reliable power, a status subsystem that provides status signals related to amplifier state, amplifier signal levels, and environmental conditions, and sets of dedicated output ports for each of multiple amplifiers of the amplifier subsystem 104.

The input subsystem 102 includes a test input for applying a test signal that tests a signal path through an amplifier of the amplifier subsystem. Additionally, the input subsystem 102 includes a current injector (e.g., a bias tee) for applying DC current to the amplifier subsystem via a communications pathway common to the antenna signals. In further support of compatibility with other equipment and field applications, the output signal levels can be manually controlled via the output control subsystem 108. These and other innovative aspects will be described in greater detail herein.

Figure 2:
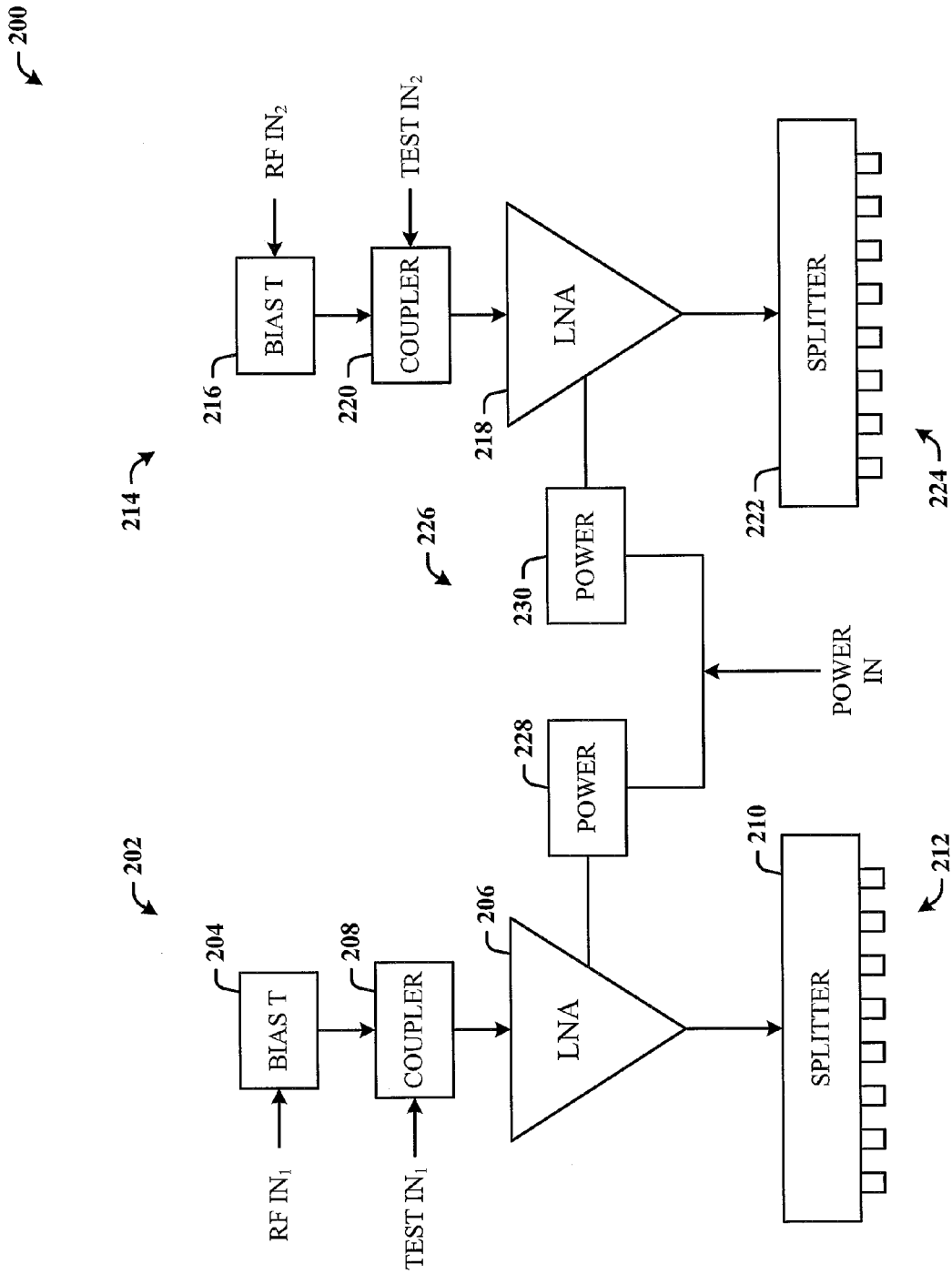
FIG. 2 illustrates a more detailed implementation of a cellular signal conditioning and distribution system.

FIG. 2 illustrates a more detailed implementation of a cellular signal conditioning and distribution system 200. Here, the system 200 (also referred to as an active interface) is a dual channel implementation; however, it is to be understood that additional channels can be incorporated into the system 200 by adding additional amplifier subsystems. A first channel 202 includes a first bias component 204 (e.g., a Bias T) for receiving a first cellular signal (denoted RF IN$_1$) and applying a DC current and/or voltage to a first amplifier 206 (e.g., a Low Noise Amplifier (LNA)) via a cable that also provides the signal pathway to the first LNA 206.

In other words, the cable (or connection) can include one or more electrically conductive pathways (e.g., extra wires and/or shield) in the same (or separate) cable(s) (or common to) that conducts the input signal (e.g., a cellular diversity signal) to the first LNA 206. The electrical pathway between the first bias component 204 and the first LNA 206 can include a first coupler 208 that not only facilitates input of a test signal (denoted TEST IN$_1$), but can also provide attenuation and/or filtering, if desired, of the first input signal to the first LNA 206. The output of the first LNA 206 is to a first distribution splitter 210 that provides electrical isolation between multiple first output connections 212 (e.g., 8-port, 16-port, etc.).

Additionally, the isolated distribution ports prevent feedback of signals to other ports from equipment failure or design inadequacies of any other equipment. This also facilitates "hot swapping" of connected distribution port equipment, since the unplugging or bringing down of one base station does not affect other bay stations or any of the RF devices in the site.

Similarly, the system 200 can include a second channel 214 that includes a second bias component 216 (e.g., a Bias T) for receiving a second cellular signal (denoted RF IN$_2$) and applying a DC current and/or voltage to a second amplifier 218 (e.g., an LNA) via a cable that also provides the signal pathway to the second LNA 218. In other words, the cable (or connection) can include one or more electrically conductive pathways (e.g., extra wires and/or shield) in the same (or separate) cable(s) (or common to) that conducts the input signal (e.g., a cellular diversity signal) to the second LNA 218. The electrical pathway between the second bias component 216 and the second LNA 218 can include a second coupler 220 that not only facilitates input of a test signal (denoted TEST IN$_2$), but can also provide attenuation and/or filtering, if desired, of the second input signal to the second LNA 218. The output of the second LNA 218 is to a second distribution splitter 222 that provides electrical isolation between multiple second output connections 224 (e.g., 8-port, 16-port, etc.).

The system 200 can also include a redundant power supply system 226 that includes a first power supply 228 for the first channel 202 and a second power supply 230 for the second channel 214. Accordingly, if one of the supplies fails, the other supply can provide the power necessary to maintain the system 200 for distribution of the input diversity signals. In other words, a phone call will still be maintained.

Figure 3:
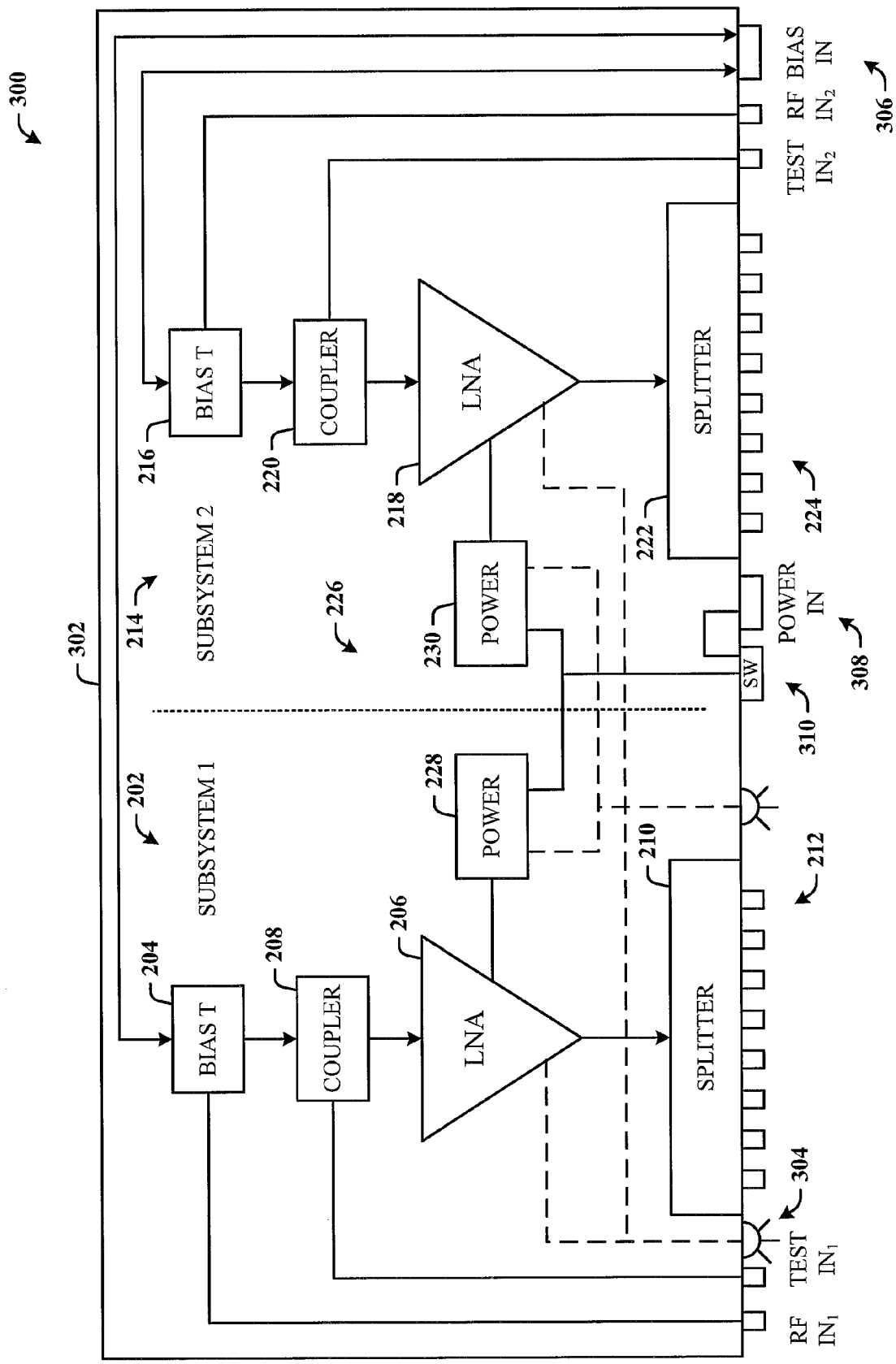
FIG. 3 illustrates a carrier-based cellular signal conditioning and distribution system implemented in a single chassis or unit.

FIG. 3 illustrates a carrier-based cellular signal conditioning and distribution system 300 implemented in a single chassis or unit 302. The unit 302 is a dual channel chassis that includes the channels (202 and 214) of FIG. 2. The chassis 302 can be a rack-mountable system with a physical interface that exposes the isolated distribution connections (212 and 224), the diversity signal inputs (RF IN$_1$ and RF IN$_2$) and test inputs (TEST IN$_1$ and TEST IN$_2$). Although illustrated as being all on the same side (or panel) of the chassis 302, the physical interface connections can be distributed on the sides (e.g., back panel), as desired for the given application and design.

The unit 302 also provides an amplifier status alert or signal via a panel indicator 304 which can be configured or designed to indicate a change in amplifier state, such as a stage failure of a multi-stage amplifier, for example. The unit 302 can also include a bias connection 306 for interfacing the bias current and/or voltage to the respective amplifier subsystems (202 and 214).

A power-in connection 308 facilitates providing different compatible voltages to the unit 302. The power is switchable via a switch 310 (e.g., manually or automatically controlled) for applying the desired voltage to the LNAs (206 and 218). This feature facilitates compatibility with existing in-situ equipment and/or for new equipment that may be brought in to replace or upgrade existing equipment that may also require different electrical interfaces and/or physical connections.

In one specific implementation, the system 300 is utilized as a cellular-band receive multi-coupler for two receive paths, where each path includes the LNAs followed by an 8-way splitter of isolated distribution ports, in a rack mount-standard tray. Each amplifier can be alarmed and driven by an independent power supply that can be fed directly from a base site DC power source. In a bypass mode, the LNAs are bypassed and the system 300 behaves as a passive splitter assembly.

The system 300 can employ an operational frequency band that includes a complete receive cellular A and B bands ranging from A through B, including all extended spectrum for each band.

The system 300 can include dual two-stage LNAs for redundancy such that problems with one stage do not completely terminate the output signal. In other words, the amplifier that fails can be bypassed. This can reduce the output signal level, but the signal is not totally terminated.

The Bias-T is included in the chassis 302 to eliminate costs associated with external units that would normally be required to inject the DC current for powering the LNAs. This also provides some internal voltage protection against voltage spikes, for example.

The output signal is distributed equally over the number of ports (e.g., right) on each a diversity main and the receive diversity branch. Another feature is the use of different gains and/or applications of the TMAs, which conventionally can be expensive to administer. This feature is an internal bypass circuit to set the outputs based on what is on the tower (or base station equipment). The bypass model is basically the two different types of TMA that allows the use of the same connections to the same base station models, or the same RF equipment in the background, with the same signal and signal clarity by only the change of a switch.

There can exist different gain or amplification levels of the TMAs in the field and to change these settings is an expensive prospect. To accommodate different field systems, the active interface includes a bypass subsystem (or circuit) that can be switched to match the appropriate field application. Thus, the outputs can be set to accommodate the desired output and field application for the system at the site tower location. This provides additional cost savings by not requiring a separate piece of equipment for this task. In one implementation, the bypass subsystem model includes two different configurations that are compatible with the TMAs employed. However, it is to be appreciated that the bypass subsystem can be designed to accommodate different types of TMAs by providing a more selectable subsystem for the desired interface.

In other words, the configurable bypass subsystem facilitates the simple installation of the active interface into the existing system without the replacement or addition of other equipment. The same base station RF equipment and connections can be utilized without significant physical system changes such as re-racking, if at all. Moreover, the active interface provides the same or better signal levels and signal clarity.

The chassis includes input ports for A and B inputs referred to respectively and commonly as main and diversity inputs. Redundancy is provided in the dual power supplies, and also by way of a balanced amplifier system, as indicated above. Thus, if one of the amplifiers on either of side A or side B fails, only 3 dB (or half-power) of signal is lost, and not the whole amplifier. On the outputs, two separate RF feeds are utilized. This architecture allows one feed to be operational in case one feed goes down. Diversity provides a better throughput and also a better range, clarity and CI (clarity index). Other supply voltages are contemplated.

There can be two different types of DC supply voltage to power the unit 302 and onboard subsystems: a positive 24-volt system and a negative 48-volt DC power supply. The system 300 accepts either type of voltage without any configuring required. This also reduces equipment replacement.

The system 300 allows the basic distribution of all the receive signals to any technology or any RF unit, and never have to rely on any given base station, any given manufacturer, or any given part other than this to distribute those receive signals. The system 300 and chassis 302 is agnostic while meeting vendor specifications for distributing the receive signals.

Figure 4:
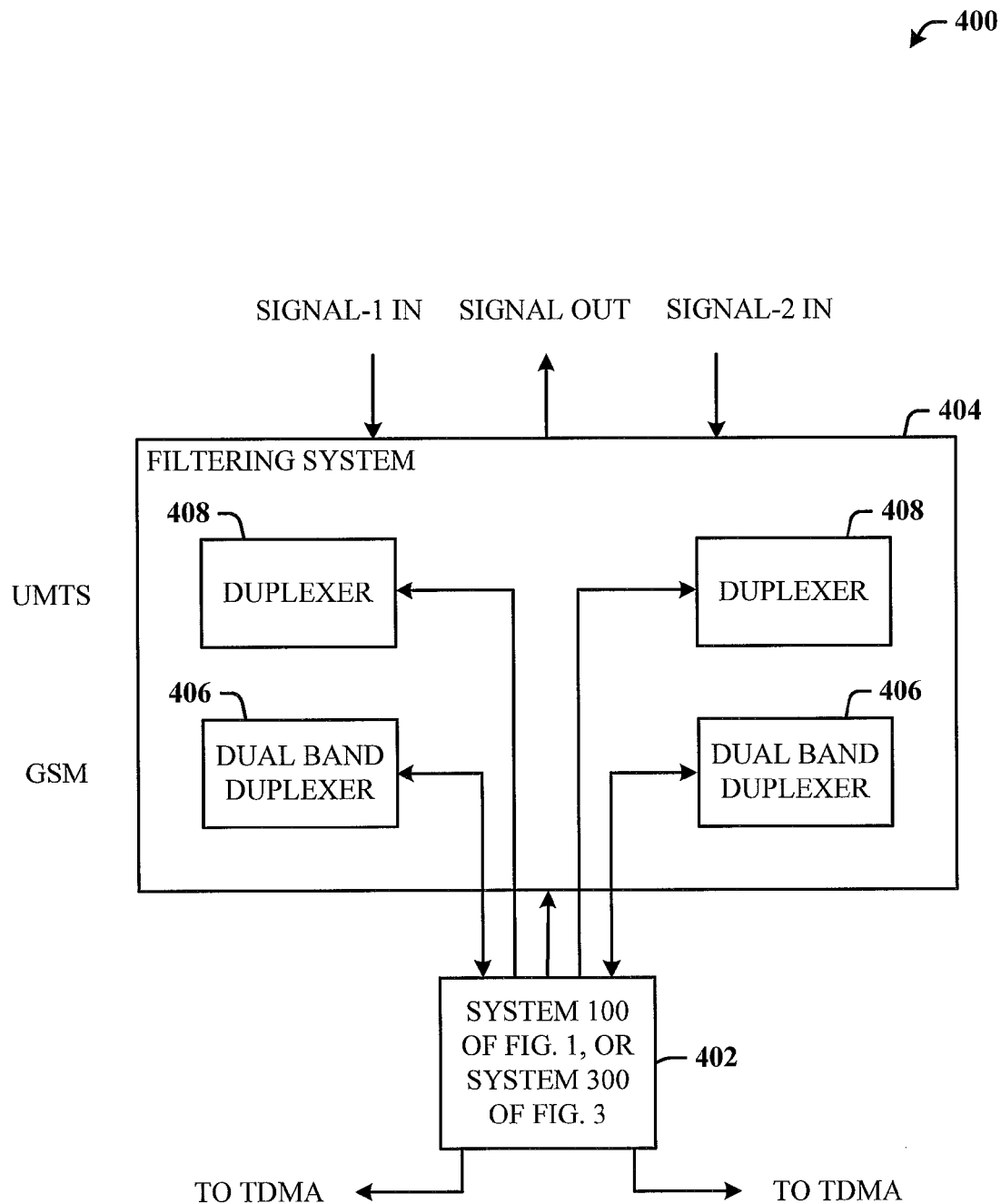
FIG. 4 illustrates a more expansive cellular signal distribution system where an active interface is employed in combination with a filtering subsystem.

FIG. 4 illustrates a more expansive cellular signal distribution system 400 where an active interface 402 (e.g., the system 100 of FIG. 1 or system 300 of FIG. 3) is employed in combination with a filtering system 404. The filtering system 404 provides filtering of the input (denoted SIGNAL-1 IN and SIGNAL-2 IN) and amplified signals (e.g., cellular diversity signals). The filtering system 404 can include one or more dual-band duplexers 406 and/or duplexers 408. Here, the dual-band duplexers 406 can be employed for GSM network signals, and the duplexers 408 for UMTS network signals.

The set of dual duplexers 406 are inline with the feed lines that provide the transmission and receipt of signals to the RF antennas (not shown). The RF antennas are a set of feed lines (or some type of line) that routes the RF signals down to a given point in a cellular tower base station. In this case, a goal is to reduce the number of feed lines or at least main the current number of feed lines by employing line sharing to achieve the same frequency.

The RF feed signals are processed through the filtering system 404 and into the active interface 402. From there the signal is routed to various nodes (e.g., E-911, GSM, UMTS, etc.). On the second half of the dual duplexers 406, the signal is routed back in and sent to the original base station that is connected to the feed lines, and then to all the other feed lines. Accordingly, all the other receive feed lines can then be taken from that receive active interface 402 and provided at the proper input voltage and noise figure to every other base station equipment with the use of cables and attenuators specified to a given loss and to achieve a given noise figure into the front end of the base station equipment.

Figure 5:
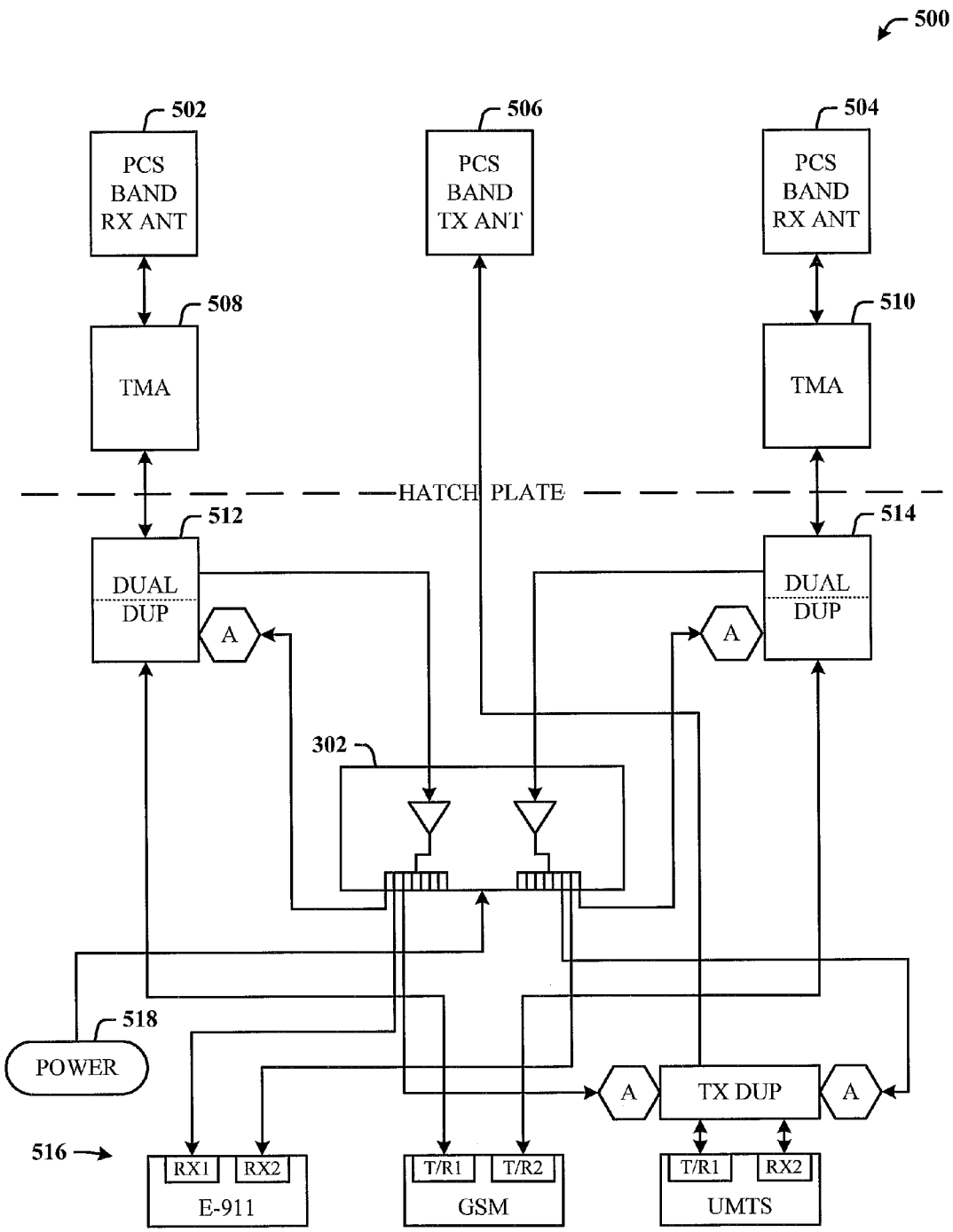
FIG. 5 illustrates a more detailed implementation of a system for E-911, GSM and UMTS deployment.

FIG. 5 illustrates a more detailed implementation of a system 500 for E-911, GSM and UMTS deployment. A goal is to save feed lines where a change in down line equipment may be required or is desired. This can be difficult if not impossible or very expensive to add feed lines so there needs to be line sharing in order to maintain the same frequency.

The system 500 includes a first feed line 502 (e.g., PCS 1900 band receive antenna), a second feed line 504 (e.g., PCS 1900 band receive antenna) and a transmit antenna 506 (e.g., PCS 1900 band transmit antenna).

The receive diversity signals from the feed lines (502 and 504) can be fed into respective tower mounted amplifiers (TMAs) (508 and 510) to drive the signal to the base station (or sector tower) equipment. The TMAs (508 and 510) are employed by network operators to cost effectively improve the performance of the existing cellular network by improving call and data quality, increasing power and sensitivity, and reducing dropped calls. One method of supplying DC power to a TMA on the tower is from a Bias-T component up through the coax signal cable. Thus, no extra wires need to be run. One Bias-T can be required for each TMA.

From the TMAs (508 and 510) the signal is routed into a first half of corresponding dual duplexers (512 and 514), out of the dual duplexers (512 and 514) and into the active interface 302. From the active interface 302, the input signal is distributed to the various base station nodes 516 (e.g., E-911, GSM and UMTS).

The signals are routed back into a $2^{nd}$ half of the dual duplexers (512 and 514), sent to the original base station(s) that connect to the feed lines, and then to all other feed lines. The other receive feed lines can then be obtained from that active interface 302 and distributed at the proper input voltage and noise figure to every other base station with the use of cables and attenuators (denoted A) that are specified to a given loss and to achieve a given noise figure into the given front end of the base station.

A power unit 518 provides power to the active interface 302 and other tower systems. The power unit 518 can be an alarmed power supply that supports a predetermined number of TMAs, or enough for a three sector base station, for example.

Following is a general summary of aspects of the disclosed architecture. The active interface chassis (or tray) is provided for receiving carrier-based cellular RF signals, and a filtering chassis via a dual duplexer system for providing signal filtering for disparate signal systems. The active interface and filtering system work can be employed to work together.

The active interface receives, amplifies, and splits the cellular signals for distribution. The interface includes interconnections for forwarding signals to individual chassis and how get the signals back out. Both the duplexer and active interface chassis facilitate the receiving, filtering and distributing the signals to many different base station technologies and/or equipment using commonly used physical and electrical interconnections.

The hatch plate is demarcation between the cellular tower and the associated equipment shelter.

The active interface routes the input signal from the feed line to signal conditioning. The active interface includes dual two-stage LNAs (low noise amplifiers). In order for the full signal level to be at the output, both stages must be operational. However, if one of the LNA stages fails, the input signal continues to the remaining stage for output, but at a reduced amplified level. The input signal of the failed stage is jumped around the failed stage into the other amplifier stage. In other words, in order for total signal loss to occur, both stages of the LNA must fail. This provides added reliability to the system.

The active interface includes two redundant subsystems, referred to as the diversity main and the diversity branch, each diversity subsystem supplying eight output ports. The signal is distributed substantially equally over the output ports (e.g., eight ports). The disclosed system provides antenna diversity is a technique in which the information-carrying signal is transmitted along different propagation paths, achieved by using multiple receiver antennas (diversity reception) and/or by using multiple transmitting antennas (transmit diversity). A diversity combining circuit combines or selects the signals from the receiver antennas to constitute an improved quality signal.

The disclosed universal aspects of the system also address timing considerations that could be a problem by mixing systems at the base station. In other words, the introduction of a new piece of equipment unlike the previous unit can require an end-to-end calibration in the receive path, the cost of which can be expensive. For example, an E-911 location system can be one that requires precise time measurements through communications pathways and the associated E-911 equipment.

This allows for the distribution of the receive signals to most technologies or RF units, and to reduce reliance on proprietary equipment in any given base station.

Figure 6:
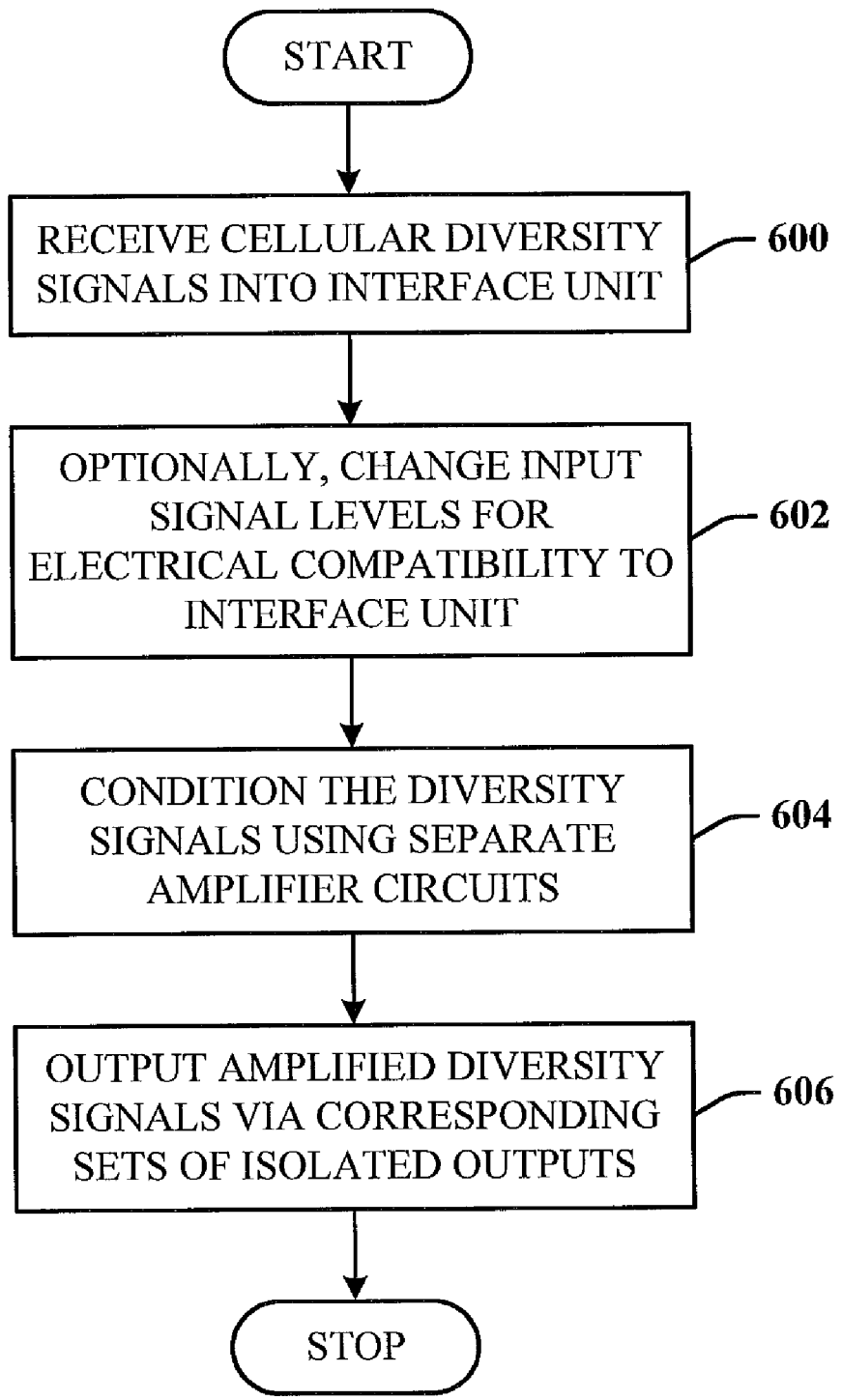
FIG. 6 illustrates a methodology of receiving and distributing cellular signals in accordance with the disclosed architecture.

FIG. 6 illustrates a methodology of receiving and distributing cellular signals in accordance with the disclosed architecture. The disclosed methodology is not limited to the order shown.

At 600, cellular diversity signals are received into an interface unit. At 602, the input levels can be changed, optionally, to the desired levels for electrical compatibility to the unit and/or unit subsystems. At 604, the diversity signals can be conditioned using separate amplifier circuits. At 606, the amplified diversity signals are output via corresponding sets of isolated outputs.

Figure 7:
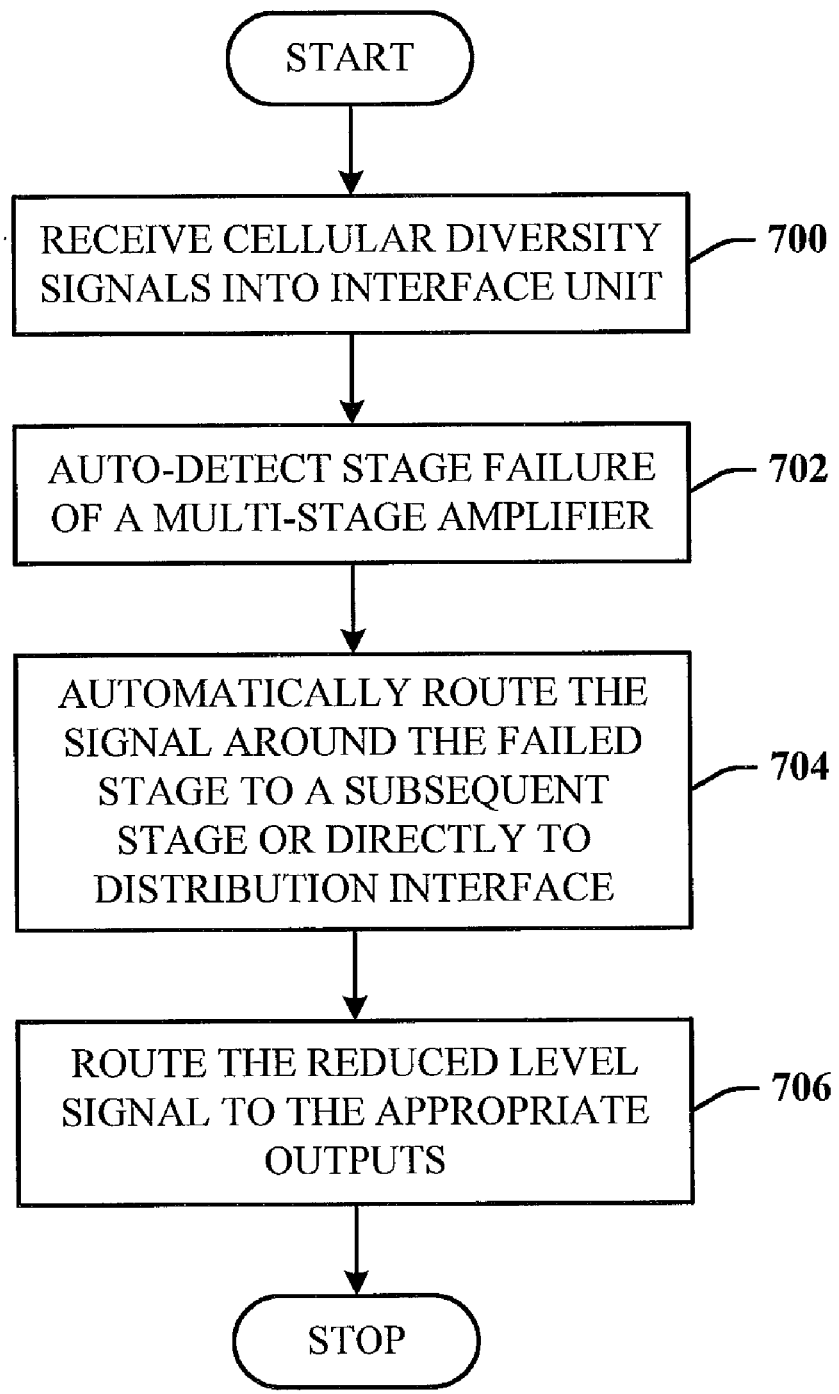
FIG. 7 illustrates a method of maintaining reliable signal output.

FIG. 7 illustrates a method of maintaining reliable signal output. At 700, cellular diversity signals are received into corresponding amplifier circuits. At 702, auto-detect stage failure of a multi-stage amplifier. At 704, automatically route the signal around the failed stage to a subsequent stage or directly to the distribution interface. At 706, route the reduced level signal to the appropriate outputs.

Following is one exemplary set of specifications for the system 300 of FIG. 3. It should be understood, however, that specifications other than those described herein may be utilized. The system 300 can operate when DC power is applied. The average net receive gain across the operational frequency band (OFB) from the LNA input to each of the splitter outputs can be about 20 dB±1 dB. The receive gain flatness of the system 300 across the OFB may not deviate from the receive gain by greater than ±1 dB. The gain of the system 200 will not exceed ±0.2 dB within any 3.84 MHz frequency range, for example. The noise figure (NF) does not exceed 1.5 dB. In one implementation, typical NF can be several tenths lower than the 1.5 dB value. The input third-order intercept point (IIP3) at the RF inputs will not be less than +12 dBm. With respect to phase linearity, the standard deviation of phase ripple can be $\leq 2°$ from linear phase over any 3.84 MHz channel bandwidth within the OFB.

RF, power, and grounding connections can be accessible from the front panel of the chassis. Splitter outputs can have isolation of at least 30 dB across the OFB. Splitter outputs can be AC coupled. RF connectors can be N-type receptacle connectors. Test-In connectors can be QMA-type receptacle connectors. RF outputs can be QMA receptacle connectors. Rack mount dimensions can be for standard nineteen inch cabinet expandable with replaceable flange on either side to cabinets of greater width.

A power source is capable, optionally, of taking either +24V or −48V input power sources with up to 250 mV spurious ripple below 1 KHz, and ±15% mean voltage offset from the +24V or −48V target values. There is a green LED observable from the front of the system chassis as a power indication to show (in the lighted condition) positive DC power application to both of the on-board power supplies.

Each receive (RX) input includes a Bias-T capable of delivering a DC voltage at 20V±1.5V at a current of up to 1A to the RF input. The drive voltage for each of the Bias-Ts can be supplied via the front panel of the chassis using a single Molex-type (or equivalent) connector with two pairs of connections in a single connector housing. This minimizes the potential for swapping of power connectors during installation. Note this can be particularly useful since base sites can automatically compensate RX path gain in the event of a TMA failure. It is therefore desirable to ensure the TMA current alarm is associated with the correct RX path. This Molex-style (or equivalent connector) includes a retention clip to avoid accidental disconnection.

Each Bias-T current path can be fuse protected against currents exceeding 2A for greater than 100 ms duration. Such fuses are field replaceable from the front of the chassis. There can be one red alarm LED observable from the front of the chassis to show (in the lighted condition) an alarm condition for the on-board LNAs. The alarm condition can occur whenever amplifier bias current is outside of a range that would indicate compliance with gain specifications. The Alarm Indication LED can also capture alarms from the power supplies, for example.

Power can be connected at the front of the chassis using a connector that will prevent accidental short circuiting of power to ground. This connector can also be of a type that locks into position and cannot be accidentally disconnected. A power switch can be provided on the front of the chassis for applying DC power to the onboard power supplies. The power switch can be of a type that cannot be accidentally thrown by inadvertent physical contact. A chassis front panel can also include multi-colored LED indication of gain state.

The DC power input can be fused independently for each internal power supply. The system 300 can also provide both normally-open and normally-closed relays for connection to open collector alarm positions on a base site cabinet. The relays can handle voltages of 32V and current levels of 2A. The mounting chassis provides for a grounding lug accessible from the front.

The system 300 can have a return loss not less then 18 dB. The isolation between of the system ports can be the following:

Isolation between RX0/RX1/RX2/RX3/RX4/RX5/RX6/RX7 ports 30 dB min.

Isolation between RX path Module 0 and RX path Module 1 (RX IN 0-RX outputs) 60 dB min.

In one implementation, that each of the LNAs can be of a hybrid 2×2 design where a failure of either of the amplifiers composing the hybrid amplifier causes only a 6 dB loss of gain on that receive path. It is acceptable to initially deliver a product without a 2×2 hybrid amplifier design, but an upgrade path can be utilized.

In one exemplary implementation, a filtering subsystem of the unit 302 can employ the following specifications. In a 1900 MHz filter, insertion loss from 1850 MHz-1910 MHz can be <1.0 dB; return loss for 1850 MHz-1910 MHz can be 1.8 dB; rejection can be the following:

200 MHz-1000 MHz 60 dB Min.
1000 MHz-1785 MHz 70 dB Min.
1785 MHz-1805 MHz 63 dB Min.
1805 MHz-1830 MHz 38 dB Min.
1930 MHz-1990 MHz 90 dB Min.
1990 MHz-2170 MHz 77 dB Min.
2170 MHz-14000 MHz 40 dB Min.
14000 MHz-18000 MHz 20 dB Min.

Phase linearity for any 3.84 MHz band can be 3° max.; group delay ripple for any 3.84 MHz band can be ±100 nS max.; and, amplitude ripple for any 3.84 MHz band can be ±0.5 dB max.

In one exemplary implementation, the filtering subsystem can employ the following specifications. For an 850 MHz filter, insertion loss from 824 MHz-849 MHz can be <1.0 dB typical; return loss from 824 MHz-849 MHz can be 18 dB minimum; rejection can be the following:

0.1 MHz-700 MHz 92 dB Min.
700 MHz-765 MHz 72 dB Min.
765 MHz-800 MHz 53 dB Min.
800 MHz-814 MHz 27 dB Min.
851 MHz-869 MHz 40 dB Min.
869 MHz-894 MHz 92 dB Min.
894 MHz-960 MHz 77 dB Min.
960 MHz-2050 MHz 67 dB Min.
2050 MHz-6000 MHz 53 dB Min.
6000 MHz-12750 MHz 40 dB Min.

Phase linearity for any 3.84 MHz segment can be ±3° max.; group delay ripple for any 3.84 MHz segment can be ±100 ns max.; and, amplitude ripple for any 3.84 MHz segment can be ±0.8 dB max.

An alternative version addresses the operational frequency band of PCS-band signals from A3 to C5. The system 300 operates in a high gain mode when DC power is applied and a low gain mode without DC power applied. In the high gain mode, the average net gain across the OFB from the LNA input to each of the splitter outputs can be 10 dB±1 dB. In the low gain mode, the total loss though the unit can be 11 dB±1 dB.

The gain of the system 300 across the OFB does not deviate from the receive gain by greater than ±1 dB. The gain of the system does not exceed +/−0.2 dB within any 3.84 MHz frequency range. The IIP3 at the RF inputs shall be no less than +12 dBm.

The system chassis can include a green LED observable from the front to show (in the lighted condition) positive DC power application to both of the on-board power supplies.

Each RX input can have a Bias-T capable of delivering a DC voltage at 13.5V ±1.5V at a current of up to 1A to the RF input. The drive voltage for each of these Bias-Ts can be supplied via the front of the chassis using a single Molex-type, or equivalent connector with two pairs of connections in a single connector housing. Each Bias-T current path can be fuse protected against currents exceeding 2A for >100 ms duration.

There can be a red LED observable from the front to show (in the lighted condition) an alarm condition for both of the on-board low noise amplifiers. The alarm condition can occur whenever amplifier bias current is outside of a range that would indicate compliance with gain specifications. The Alarm Indication LED can also capture alarms from the power supplies.

A high gain/low gain mode switch can be provided via the front panel of the chassis for the selection of the gain mode. A front panel multi-colored LED indicator of gain state can also be implemented. The system 300 provides both normally-open and normally-closed relays for connection to open collector alarm positions on a base site cabinet. Such relays can handle voltages of 32V and current levels of 2A.

Although applicable to any existing or yet to be developed wireless telecommunications network, the aspects of the invention will be described with reference to the global system for mobile communications (GSM) air interface that uses general packet radio service (GPRS) as an enabling bearer. Examples of other suitable wireless and radio frequency data transmission systems include networks utilizing time division multiple access (TDMA), frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols.

Figure 8:
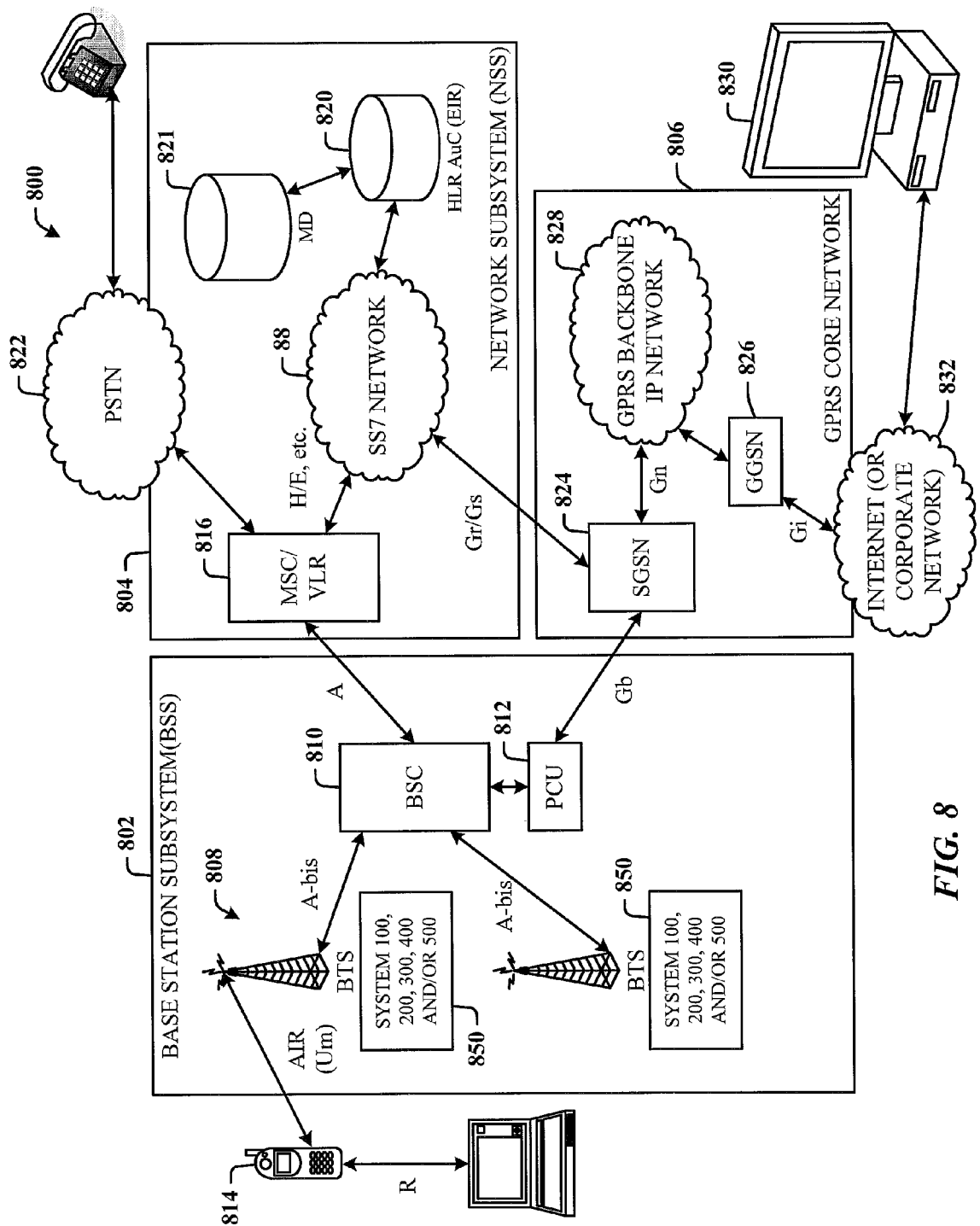
FIG. 8 illustrates an exemplary GSM network that can employ the universal active interface.

FIG. 8 illustrates an exemplary GSM network 800 that can employ the universal active interface. The GSM system, designed as a 2G cellular communications system, utilizes TDMA technology to enable greater call capacity. Digitally-encoded speech can also be ciphered to retain call privacy. Voice calls are the primary function of the GSM system. To achieve this, the speech is digitally encoded, and later decoded using a vocoder.

GSM also supports a variety of other data services, although the performance for such data services (e.g., facsimile videotext and teletext) is slow. One data service includes SMS that allows bi-directional messaging, store-and-forward delivery, and alphanumeric messages. The overall system definition for GSM describes not only the air interface, but also the network. GSM uses 200 KHz RF channels, and are typically multiplexed to, for example, enable eight users to access each carrier.

The GSM network 800 includes a base station subsystem (BSS) 802, a network subsystem (NSS) 804 and a GPRS core network 806. The BSS 802 can include one or more base transceiver stations (BTS) 808 and a base station controller (BSC) 810 connected together on an A-bis interface. The BTS and accompanying base stations (not shown) connect a cell phone to a cellular network. Base stations are all interconnected to facilitate roaming from one cell to another via a process called handover, without losing the cell connection.

A packet control unit (PCU) 812 is shown connected to the BTS 810 although the exact position of this can depend on the vendor architecture. The BSS 802 is connected by the air interface Um to a mobile terminal 814. The BTS 808 are the actual transmitters and receivers of radio signals. Typically, a BTS for anything other than a picocell will have several different transceivers (TRXs) which allow it to serve several different frequencies or even several different cells (in the case of sectorized base stations).

By using directional antennae on a base station, each pointing in different directions, it is possible to sectorize the base station so that several different cells are served from the same location. This increases the traffic capacity of the base station (each frequency can carry eight voice channels) while not greatly increasing the interference caused to neighboring cells (in any given direction, only a small number of frequencies are being broadcast).

The BSC 810 provides the intelligence behind the BTS 808. Typically, a BSC can have tens or even hundreds of BTSs 808 under its control. The BSC 810 handles allocation of radio channels, receives measurements from the mobile phones, and controls handovers from BTS to BTS (except in the case of an inter-MSC handover in which case control is in part the responsibility of the an MSC). One function of the BSC 810 is to act as a concentrator such that many different low capacity connections to the BTS 808 can become reduced to a smaller number of connections towards the MSC. Generally, this means that networks are often structured to have many BSCs 810 distributed into regions near the BTS 808 which are then connected to large centralized MSC sites.

The PCU 812 can perform some of the equivalent tasks of the BSC 810. The allocation of channels between voice and data can be controlled by the base station, but once a channel is allocated to the PCU 812, the PCU 812 takes full control over that channel. The PCU 812 can be built into the base station, built into the BSC, or even in some architectures, it can be at an SGSN site.

The BSS 802 connects to the NSS 804 by an A interface. The NSS 804 is shown containing an MSC 816 connected via an SS7 network 818 to an HLR 820. The AuC and the EIR, although technically separate functions from the HLR 820, are shown together since combining them can be performed in the network.

The combination of a cell phone 814 and a SIM card (not shown) creates a special digital "signature" that includes a subscriber number which is sent from the cell phone 814 to the nearest BTS 808 asking that the subscriber of a particular network be allowed to use the network. The request is passed on along the network of BTS 808 to the heart of a cellular network, the MSC 816. The MSC also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The NSS 804 also contains the component called HLR 820 that provides the administrative information required to authenticate, register and locate the caller as that network's subscriber. Once the HLR 820 has received a log-on request, the HLR 820 immediately checks the special "signature" contained in the request against the HLR special subscriber database. If the subscription is current, the MSC 816 sends a message back to the phone via the network of BTS 808 that indicates the caller is allowed to access the network. The name or code of that network will appear on the LCD screen of the cell phone 814. Once this network "name" message appears on the phone LCD screen, it means the caller is connected to the network and able to make and receive calls.

The HLR 820 registers which MSC the cell phone is currently connected to, so that when the network MSC 816 needs to route an incoming call to the cell phone number, it will first check the HLR 820 to see which MSC is currently serving the cell phone. Periodically, the cell phone will send a message to the MSC indicating where it is, in a process called polling. The combination of the tracking function and the caller's unique digital signature allows the MSC 816 to route that call to the precise base station the cell phone happens to be connected to, and then exclusively to the cell phone, even if a number of other subscribers are simultaneously connected to that base station.

When traveling to another MSC coverage are while driving, for example, the HLR 820 is automatically updated, and continues to monitor where exactly it should route the calls should the caller then move within range of another base station. This routing procedure means that out of hundreds of thousands of subscribers, only the correct cell phone will ring when necessary.

The NSS 804 has a direct connection to the PSTN 822 from the MSC 816. There is also a connection to from the NSS 804 to the GPRS core network 806 via a Gr/Gs interface although this is optional and not always implemented. The illustrated GPRS Core Network 806 is simplified to include a SGSN 824 (connected to the BSS 802 by the Gb interface) and a GGSN 826. The SGSN 824 and the GGSN 826 are connected together by a private IP network 828 called a GPRS backbone shown as the Gn reference point. A computer 830 is depicted as connecting to the core network 806 via an Internet or corporate network 832.

Some voice mail systems are linked to a network SMS Center (SMSC), a special facility that handles short messages. The SMSC generates the special SMS message that notifies the caller when they have mail waiting in a Mailbox. SMS messages can be received on an SMS-capable cell phone even while the caller is on a voice call. This is because the SMS messages are sent on a different radio frequency, the GSM data channel, than voice calls, so that the two never interfere.

The BSS 802 can include one or more of the systems 850 described herein. For example, the system 850 can include the system 100, system 200, system 300, system 400 and/or system 500.

Figure 9:
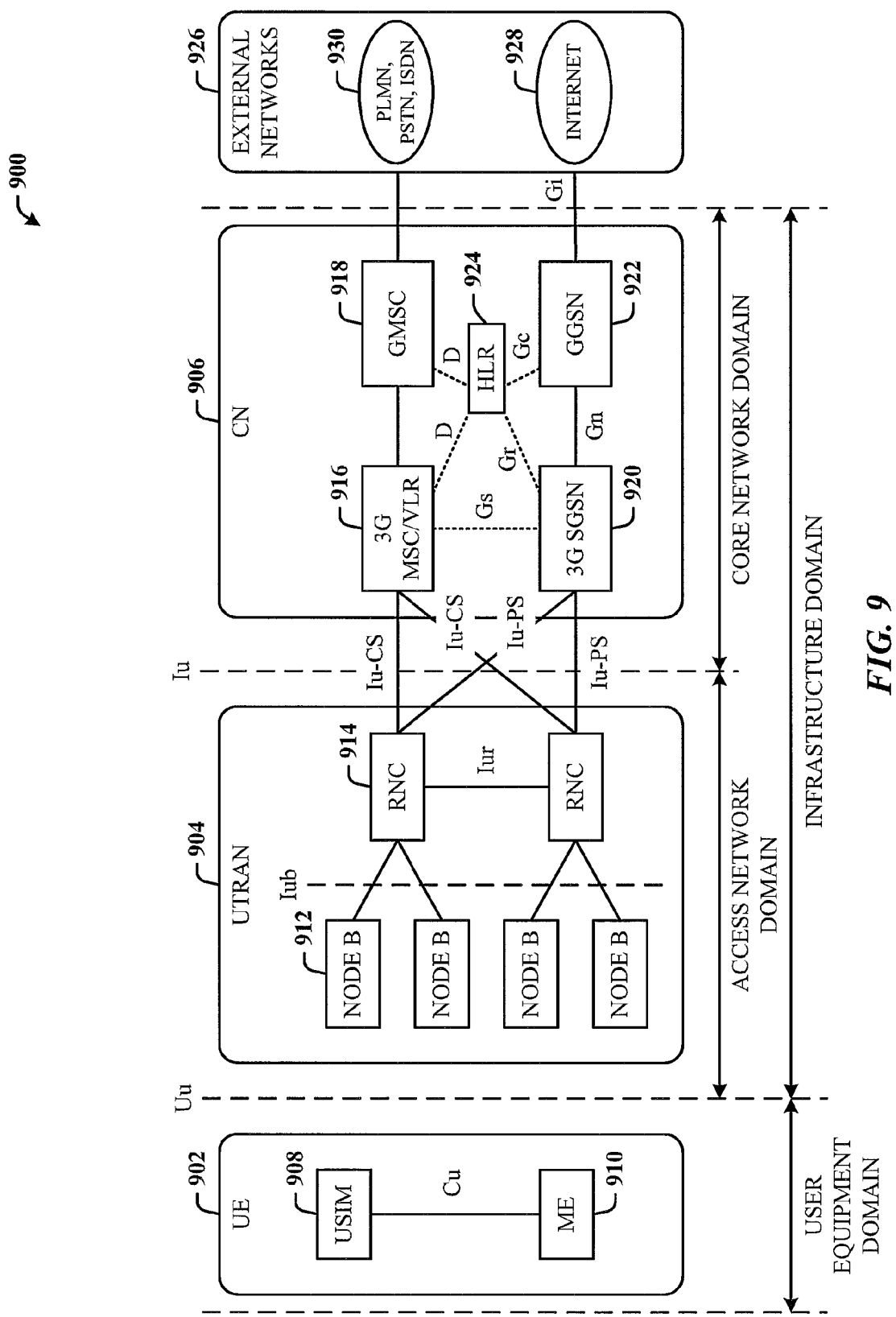
FIG. 9 illustrates an exemplary UMTS network that can employ the active interface described herein.

FIG. 9 illustrates an exemplary UMTS network 900 that can employ the active interface described herein. The architecture is based on the 3GPP (Third Generation Partnership Project) Release 99 specification. However, it is to be understood that the subject innovation can be applied to any UMTS telecommunications architecture, including by way of example, Release 5 (R5) and, R5 and Release 6 (R6) 3GPP standards. UMTS offers teleservices (e.g., speech and/or SMS-Short Message Service) and bearer services, which provide the capability for information transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the innovative aspects described herein can also be applied to other frequency bands. UMTS can be used in other cellular/PCS frequencies, for example, 825-849 MHz and 869-894 MHz, 1850-1910 MHz and 1930-1990 MHz. Bearer services can have different QoS (quality-of-service) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support have a virtual home environment, which is a concept for portability across network boundaries and between terminals in a personal service environment. Personal service environment means that users are consistently presented with the same personalized features, user interface customization and services in whatever network or terminal, wherever the user may be located. UMTS also includes network security and location based services.

The UMTS network 900 can consist of three interacting domains; a user equipment (UE) domain 902, a UMTS Terrestrial Radio Access Network (UTRAN) domain 904, and a core network (CN) domain 906. The UTRAN domain 904 is also referred to as the access network domain and the CN 906 is referred to as the core network domain, the both of which comprise an infrastructure domain.

The UE domain 902 includes a USIM (user services identity module) domain and an ME (mobile equipment) domain. User equipment is the equipment used by the user to access UMTS services. In the UE domain 902, the UMTS IC card is the USIM 908 which has the same physical characteristics as GSM SIM (subscriber identity module) card. The USIM interfaces to ME 910 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 904 provides the air interface access method for the UE domain 902. The reference point between the UE domain and the infrastructure domain is the Uu UMTS radio interface. The access network domain provides the physical entities that manage resources of the access network and facilitates access to the core network domain. In UMTS terminology, a base station of the access network domain is referred as a Node-B device 912, and control equipment for Node-B devices is called a radio network controller (RNC) 914. The interface between the Node-B device and the RNC 914 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network is divided in circuit-switched and packet-switched domains Some of the circuit-switched elements are a mobile services switching center (MSC) and visitor location register (VLR) 916 and gateway MSC (GMSC) 918. Packet-switched elements include a serving GPRS support node (SGSN) 920 and gateway GPRS support node (GGSN) 922. Some network elements such as an EIR (equipment identity register) (not shown), HLR (home location register) 924, VLR and AuC (authentication center) (not shown) can be shared by both domains.

A function of the CN 902 is to provide switching, routing and transit for user traffic. The CN 902 also contains the databases and network management functions. The basic CN architecture for UMTS is based on the GSM network with GPRS (general packet radio service) capability. All equipment is modified for UMTS operation and services. The radio access network has several interfaces which can be configured and dimensioned. The CN 906 interfaces to the radio access domain via an Iu interface. An Iu-CS (circuit-switched) reference point interfaces an RNC of the access network to the MSC/VLR entity 916 of the CN 906 for voice from/to the MSC/VLR 916. An Iu-PS (packet-switched) reference point interfaces an RNC of the access network to the SGSN entity 920 of the CN 906 for data from/to the SGSN 920.

In the CN 906, a Gs interface is provided between the MSC/VLR 916 and the SGSN. A Gn interface is provided between the SGSN 920 and the GGSN 922. A D interface is provided between the MSC/VLR 916 and the HLR 924, and the HLR 924 and the GMSC 918. A Gr interface is provided between the SGSN 920 and the HLR 924. A Ge interface is provided between the GGSN 922 and the HLR 924.

The CN 906 provides the interface from the UE domain 902 to external networks 926 such as the Internet 928 via a Gi interface from the GGSN 922, and other networks 930 via the GMSC 918, which can include a PLMN (public land mobile network), PSTN (public switched telephone network) and ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 906 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR and SGSN can merge to become a UMTS MSC.

Paired uplink and downlink channel spacing can be 5 MHz and raster is 200 kHz. An operator can use 3-4 channels (2×15 MHz or 2×20 MHz) to build a high-speed, high-capacity network. Frequencies 1900-1920 MHz and 2010-2025 MHz can be utilized for TDD and TD/CDMA. Unpaired channel spacing can be 5 MHz and raster is 200 kHz. Transmit and receive are not separated in frequency. Frequencies such as 1980-2010 MHz and 2170-2200 MHz can be employed for satellite uplink and downlink.

The disclosed invention finds application to EDGE (Enhanced Data rates for GSM Evolution) technology. EDGE is effectively the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A signal distribution system, comprising:
an input subsystem for receiving a plurality of cellular-band antenna diversity signals;
an amplifier subsystem with at least two amplifiers for amplifying the received cellular-band antenna diversity signals, each amplifier of the amplifier subsystem amplifying a received cellular-band antenna diversity signal of the plurality of cellular-band antenna diversity signals;
an output subsystem for outputting the amplified signals;
an output control subsystem for controlling signal levels of at least one output of the output subsystem; and
a redundant power supply system for powering the amplifier subsystem, the redundant power supply having a first power supply and a second power supply, each power supply being a primary power supply for an amplifier of the at least two amplifiers in the amplifier subsystem and a backup power supply for another amplifier of the at least two amplifiers in the amplifier subsystem.

2. The system of claim 1, wherein the input subsystem, amplifier subsystem, the output subsystem, and output control subsystem are part of a single unit.

3. The system of claim 1, wherein the at least one output is electrically isolated.

4. The system of claim 1, wherein the input subsystem includes a current injector for applying direct current (DC) to the amplifier subsystem via a communications pathway common to the antenna signals.

5. The system of claim 1, wherein the first power supply and the second power supply in the redundant power supply system are powered by a common power input.

6. The system of claim 1, wherein the output subsystem includes a set of dedicated output ports for each of multiple amplifiers of the amplifier subsystem.

7. The system of claim 1, wherein the signal levels are manually controlled via the output control subsystem.

8. The system of claim 1, wherein the output subsystem includes a status subsystem that provides status signals related to amplifier state, amplifier signal levels, and environmental conditions.

9. The system of claim 1, wherein the input subsystem includes a test input for applying a test signal that tests a signal path through an amplifier of the amplifier subsystem.

10. The system of claim 1, wherein the plurality of the cellular-band antenna diversity signals are at least one of PCS-1900 and PCS-850 signals.

11. The system of claim 1, wherein the plurality of the cellular-band antenna diversity signals are at least one of GSM and UMTS signals.

12. The system of claim 1, further comprising a redundant power supply subsystem for supplying power to the amplifier subsystem.

13. A signal distribution system, comprising:
a chassis;
an input subsystem of the chassis for receiving a main diversity cellular signal and a branch diversity cellular signal;
an amplifier subsystem of the chassis that includes a main amplifier circuit for amplifying the main diversity cellular signal and a branch amplifier circuit for amplifying the branch diversity cellular signal;
an output subsystem of the chassis for outputting the amplified main diversity signal via multiple main isolated outputs and for outputting the amplified branch diversity signal via multiple branch isolated outputs; and
a power subsystem of the chassis for providing redundant power to the main amplifier circuit and the branch amplifier circuit,
wherein the power subsystem has a first power supply and a second power supply, the first power supply being a primary power supply to the main amplifier circuit and a backup power supply to the branch amplifier circuit, and the second power supply being a primary power supply to the branch amplifier circuit and a backup supply to the main amplifier circuit.

14. The system of claim 13, further comprising an output control subsystem of the chassis for controlling output signal levels of the main amplifier circuit and the branch amplifier circuit.

15. The system of claim 13, wherein each amplifier circuit includes a multi-stage low-noise amplifier (LNA) such that failure in one stage automatically passes an input signal to another stage for amplification.

16. The system of claim 13, wherein the input subsystem includes a bias component for each amplifier circuit for providing direct current (DC) and voltage to the corresponding amplifier circuits.

17. The system of claim 13, wherein the diversity signals include cellular A and B band signals.

18. The system of claim 13, wherein the input subsystem receives the diversity signals from at least one tower mounted amplifier (TMA).

19. The system of claim 18, wherein the input system includes a compatibility subsystem for changing signal levels of the received diversity signals to be compatible for a given equipment implementation.

20. The system of claim 13, further comprising a status subsystem for presenting an alert related to a change in state of at least one of the chassis subsystems.

21. The system of claim 13, wherein the output subsystem is manually controlled to output a changed signal level for at least one of the main diversity cellular signal and the branch diversity cellular signal.

\* \* \* \* \*